US012672749B2

(12) United States Patent (10) Patent No.: US 12,672,749 B2
Hong et al. (45) Date of Patent: Jul. 7, 2026

(54) CLEANING ROBOT AND CONTROLLING METHOD THEREOF

(71) Applicant: SAMSUNG ELECTRONICS CO., LTD., Suwon-si (KR)

(72) Inventors: Jongsoo Hong, Suwon-si (KR);
Yongchan Kwon, Suwon-si (KR);
Jeehoon Kim, Suwon-si (KR);
Byoungwoo Ko, Suwon-si (KR);
Donghun Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 718 days.

(21) Appl. No.: 18/107,661

(22) Filed: Feb. 9, 2023

(65) Prior Publication Data

US 2023/0329507 A1      Oct. 19, 2023

Related U.S. Application Data

(63) Continuation of application No. PCT/KR2023/000535, filed on Jan. 12, 2023.

(30) Foreign Application Priority Data

Apr. 18, 2022   (KR) ........................ 10-2022-0047837
Jul. 5, 2022   (KR) ........................ 10-2022-0082755

(51) Int. Cl.
*A47L 11/40*      (2006.01)
*A47L 11/282*      (2006.01)
*G05D 1/00*      (2006.01)
(52) U.S. Cl.
CPC ......... *A47L 11/4011* (2013.01); *A47L 11/282* (2013.01); *A47L 11/4002* (2013.01);
(Continued)

(58) Field of Classification Search
CPC .. A47L 11/4011; A47L 11/282; A47L 11/283; A47L 11/4069; A47L 11/4038
See application file for complete search history.

(56) References Cited

U.S. PATENT DOCUMENTS 5,182,833 A   2/1993  Yamaguchi et al.
5,424,939 A   6/1995  Kweon
(Continued)

FOREIGN PATENT DOCUMENTS

JP      7-28847 A   1/1995
JP      7-28847 B2   4/1995
(Continued)

OTHER PUBLICATIONS

International Search Report dated Apr. 18, 2023 for International Application No. PCT/KR2023/000535.
(Continued)

*Primary Examiner* — Shay Karls
(74) *Attorney, Agent, or Firm* — STAAS & HALSEY LLP

(57)      ABSTRACT

A cleaning robot including a main body; a motion driver configured to move the main body; a pad motor configured to rotate a pad below a bottom surface of the main body; a light source configured to irradiate light to the pad; and at least one processor configured to, based on an amount of reflection of the light from the pad, control rotation speed of the pad motor and/or control the motion driver to return the cleaning robot to a docking station.

15 Claims, 16 Drawing Sheets

(52) U.S. Cl.
CPC ....... *A47L 11/4038* (2013.01); *A47L 11/4066* (2013.01); *A47L 11/4069* (2013.01); *A47L 11/4091* (2013.01); *G05D 1/0225* (2013.01); *A47L 2201/02* (2013.01); *A47L 2201/04* (2013.01); *A47L 2201/06* (2013.01)

(56) References Cited

U.S. PATENT DOCUMENTS

| | | | |
|---|---|---|---|
| 5,613,261 | A | 3/1997 | Kawakami et al. |
| 5,668,632 | A | 9/1997 | Kobayashi et al. |
| 10,390,672 | B2 | 8/2019 | Jung et al. |
| 11,324,376 | B2 | 5/2022 | Lu et al. |
| 11,564,546 | B2 | 1/2023 | Kim et al. |
| 11,633,079 | B2 | 4/2023 | Zhang et al. |
| 2020/0397202 | A1 | 12/2020 | Artes et al. |
| 2022/0047141 | A1 | 2/2022 | Xu et al. |

FOREIGN PATENT DOCUMENTS

| | | | | |
|---|---|---|---|---|
| JP | 2843533 | B2 | 10/1998 | |
| JP | 3293314 | B2 | 4/2002 | |
| JP | 2021-503334 | A | 2/2021 | |
| JP | 6883352 | B2 | 5/2021 | |
| KR | 1994-0021010 | A | 10/1994 | |
| KR | 200435130 | Y1 * | 1/2007 | ........... A47L 11/282 |
| KR | 10-2011-0114370 | A | 10/2011 | |
| KR | 10-2014-0098619 | A | 8/2014 | |
| KR | 10-1697557 | B1 | 1/2017 | |
| KR | 10-2017-0013955 | A | 2/2017 | |
| KR | 10-1759275 | B1 | 7/2017 | |
| KR | 20-2018-0002707 | U | 9/2018 | |
| KR | 10-2019-0000894 | A | 1/2019 | |
| KR | 10-2021-0105907 | A | 8/2021 | |
| KR | 10-2385214 | B1 | 4/2022 | |

OTHER PUBLICATIONS

Written Opinion of the International Search Authority dated Apr. 18, 2023 for International Application No. PCT/KR2023/000535.

* cited by examiner

CLEANING ROBOT AND CONTROLLING METHOD THEREOF

CROSS-REFERENCE TO RELATED APPLICATIONS

This application is a continuation of International Application PCT/KR2023/000535 filed Jan. 12, 2023, and claims foreign priority to Korean application 10-2022-0047837 filed Apr. 18, 2022, and Korean application 10-2022-0082755 filed Jul. 5, 2022. The disclosures of International Application PCT/KR2023/000535, Korean application 10-2022-0047837, and Korean application 10-2022-0082755 are incorporated herein by reference in their entireties.

BACKGROUND

1. Field

The disclosure relates to a cleaning robot including a wet cloth pad.

2. Description of the Related Art

A cleaning robot is a device for cleaning a region to be cleaned while moving around by itself without user manipulation, and sometimes performs wet cleaning with a wet cloth pad arranged on the bottom these days.

In general, the cleaning robot that performs wet cleaning simply calculates a distance moved, predicts that the wet cloth pad might be contaminated when the distance is greater than a certain distance, and provides notification of cleaning or replacement of the wet cloth pad.

The prediction of a contamination degree of the wet cloth pad based on the distance moved has low accuracy, causing contamination of the floor because cleaning is continued at a low wet cleaning capability or with dirty substances on the cloth, or causing unnecessary cleaning notification for the wet cloth pad that is clean.

SUMMARY

Aspects of embodiments of the disclosure will be set forth in part in the description which follows and, in part, will be apparent from the description, or may be learned by practice of the presented embodiments.

According to an embodiment of the disclosure, a cleaning robot may include a main body; a motion driver configured to move the main body; a pad motor configured to rotate a pad below a bottom surface of the main body; a light source configured to irradiate light to the pad; and at least one processor configured to, based on an amount of reflection of the light from the pad, control rotation speed of the pad motor and/or control the motion driver to return the cleaning robot to a docking station.

According to an embodiment of the disclosure, the at least one processor is configured to control the pad motor to increase the rotation speed of the pad in proportion to a change rate of the amount of reflection of the light from the pad during motion.

According to an embodiment of the disclosure, the at least one processor is configured to control the pad motor to increase the rotation speed of the pad in proportion to an accumulated integral value of amounts of changes in the amount of reflection of the light from the pad during motion.

According to an embodiment of the disclosure, the at least one processor is configured to determine whether to control the motion driver to return the cleaning robot to the docking station by comparing the amount of reflection of the light from the pad with a reference amount of light reflection corresponding to a threshold of degradation of cleaning power.

According to an embodiment of the disclosure, the light is infrared light, and the at least one processor is configured to control the motion driver to return the cleaning robot to the docking station based on the amount of reflection of the light from the pad being equal to or greater than the reference amount of light reflection corresponding to the threshold of degradation of cleaning power.

According to an embodiment of the disclosure, the light is visible light, and the at least one processor is configured to control the motion driver to return the cleaning robot to the docking station based on the amount of reflection of the light from the pad being equal to or smaller than the reference amount of light reflection corresponding to the threshold of degradation of cleaning power.

According to an embodiment of the disclosure, the at least one processor is configured to control cleaning and/or replacement of the pad to be guided for a user based on controlling the motion driver to return the cleaning robot to the docking station.

According to an embodiment of the disclosure, the at least one processor is configured to control the pad motor not to rotate the pad based on controlling the motion driver to return the cleaning robot to the docking station.

According to an embodiment of the disclosure, the at least one processor is configured to control the pad to be separated from a floor based on controlling the motion driver to return the cleaning robot to the docking station.

According to an embodiment of the disclosure, the at least one processor is configured to determine whether to control the motion driver to return the cleaning robot to the docking station by comparing an accumulated integral value of amounts of changes in the amount of reflection of the light from the pad with a reference accumulated integral value corresponding to a threshold of degradation of cleaning power.

According to an embodiment of the disclosure, the at least one processor is configured to adjust the reference amount of light reflection corresponding to the threshold of degradation of cleaning power to control the motion driver to return the cleaning robot to the docking station sooner based on the amount of reflection of the light from the pad changing at a preset change rate or higher.

According to an embodiment of the disclosure, the at least one processor is configured to change an amount of adjusting the reference amount of light reflection according to user settings.

According to an embodiment of the disclosure, the at least one processor is configured to adjust the reference amount of light reflection corresponding to the threshold of degradation of cleaning power to control the motion driver to return the cleaning robot to the docking station sooner based on the amount of reflection of the light from the pad remaining at the preset change rate or higher for a preset period of time.

According to an embodiment of the disclosure, the at least one processor is configured to control a current location of the cleaning robot to be displayed as an event occurrence region on a cleaning map based on the amount of reflection of the light from the pad changing at the preset change rate or higher.

According to an embodiment of the disclosure, the at least one processor is configured to set a current location of the cleaning robot to a restricted cleaning area based on the amount of reflection of the light from the pad changing at the preset change rate or higher.

BRIEF DESCRIPTION OF THE DRAWINGS

These and/or other embodiments of the disclosure will become apparent and more readily appreciated from the following description of the embodiments, taken in conjunction with the accompanying drawings of which.

DETAILED DESCRIPTION

Figure 1:
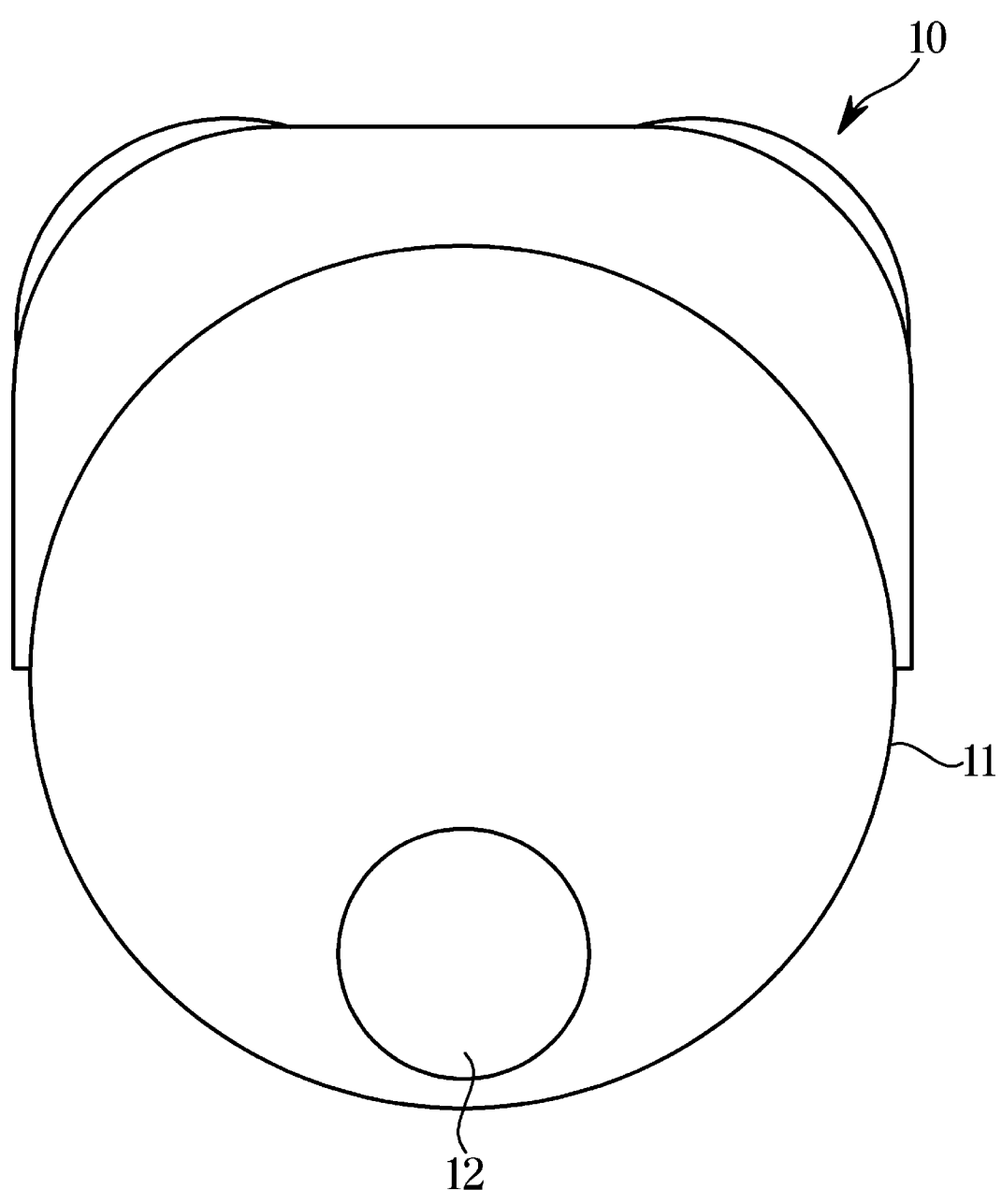
FIG. 1 is a top view of a cleaning robot, according to an embodiment of the disclosure.

Embodiments and features as described and illustrated in the disclosure are merely examples, and there may be various modifications replacing the embodiments and drawings at the time of filing this application.

It will be further understood that the term "connect" or its derivatives refer both to direct and indirect connection, and the indirect connection includes a connection over a wireless communication network.

The terminology used herein is for the purpose of describing particular embodiments only and is not intended to limit the disclosure. It is to be understood that the singular forms "a," "an," and "the" include plural references unless the context clearly dictates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The terms including ordinal numbers like "first" and "second" may be used to explain various components, but the components are not limited by the terms. The terms are only for the purpose of distinguishing a component from another. Thus, a first element, component, region, layer or room discussed below could be termed a second element, component, region, layer or section without departing from the teachings of the disclosure.

Furthermore, the terms, such as "— part", "— block", "— member", "— module", etc., may refer to a unit of handling at least one function or operation. For example, the terms may refer to at least one process handled by hardware such as field-programmable gate array (FPGA)/application specific integrated circuit (ASIC), etc., software stored in a memory, or at least one processor.

Reference numerals used for method steps are just used to identify the respective steps, but not to limit an order of the steps. Thus, unless the context clearly dictates otherwise, the written order may also be practiced otherwise.

Embodiments of the disclosure provide a cleaning robot, and method for controlling the same, capable of controlling cleaning intensity or determining return to a docking station based on an amount of reflection of light irradiated to and reflected from a wet cloth pad.

According to an embodiment of the disclosure, a method of controlling a cleaning robot including a main body, a motion driver for moving the main body, a wet cloth pad rotationally arranged on a bottom surface of the main body, and a pad motor for rotating the wet cloth pad may include controlling a light sensor module to irradiate light to the wet cloth pad; controlling the light sensor module to determine an amount of reflection of light from the wet cloth pad; and controlling rotation speed of the pad motor or control the motion driver to return to a docking station based on the amount of reflection of light from the wet cloth pad.

The controlling of the rotation speed of the pad motor may include controlling the pad motor to increase rotation speed of the wet cloth pad in proportion to a change rate of the amount of reflection of light from the wet cloth pad during motion.

The controlling of the motion driver to return to the docking station may include determining whether to return to the docking station by comparing the amount of reflection of light from the wet cloth pad with a reference amount of reflection of light corresponding to a threshold of degradation of cleaning power.

The controlling of the motion driver to return to the docking station may include adjusting the reference amount of reflection of light corresponding to the threshold of degradation of cleaning power to return to the docking station sooner based on the amount of reflection of light from the wet cloth pad changing at a preset change rate or higher.

According to an embodiment, a cleaning robot may have increased wet cleaning efficiency by controlling cleaning intensity or determining to return to a docking station based on an amount of reflection of light irradiated to and reflected from a wet cloth pad.

Reference will now be made in detail to embodiments of the disclosure, which are illustrated in the accompanying drawings.

Figure 2:
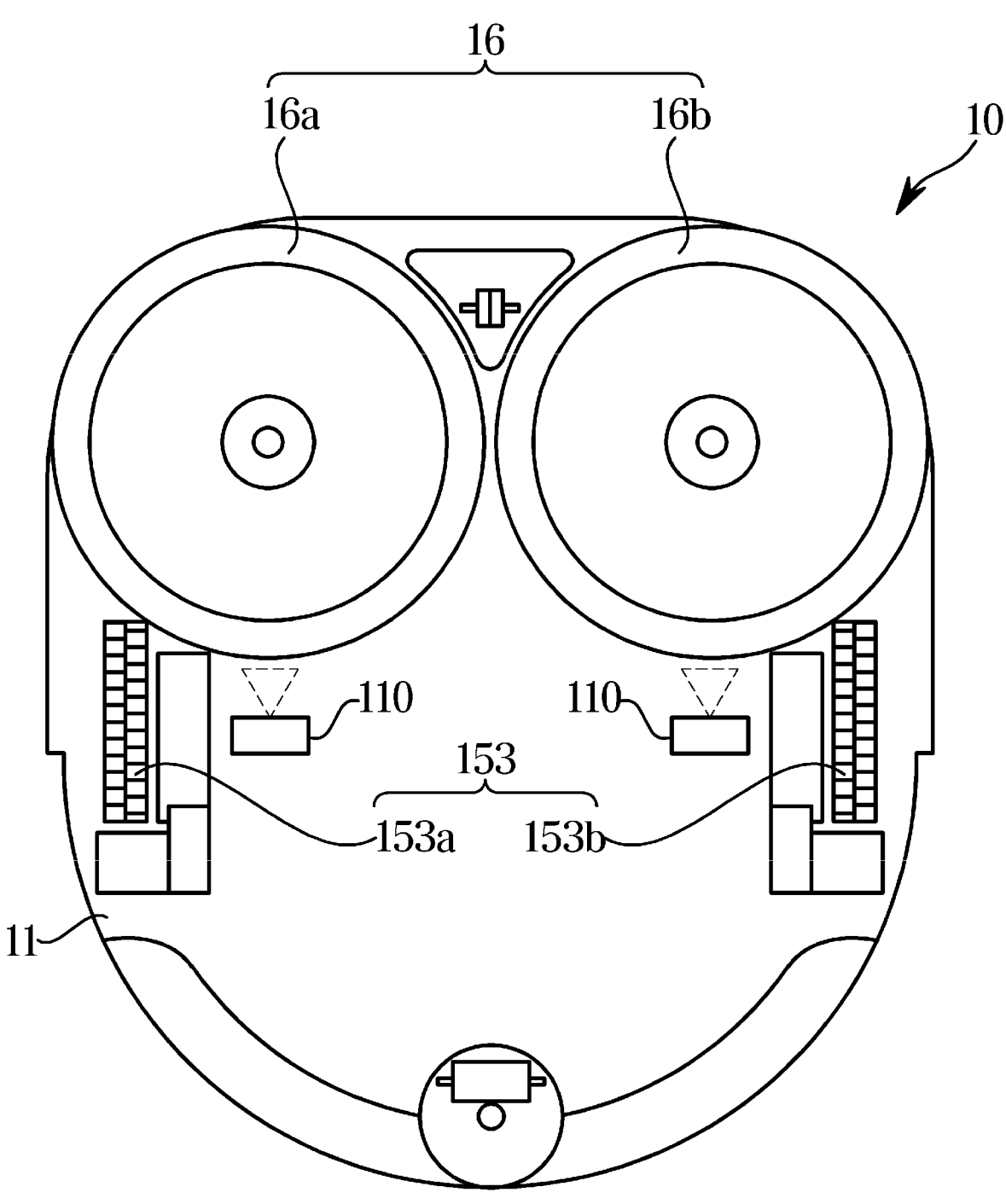
FIG. 2 is a bottom view of a cleaning robot, according to an embodiment of the disclosure.
Figure 3:
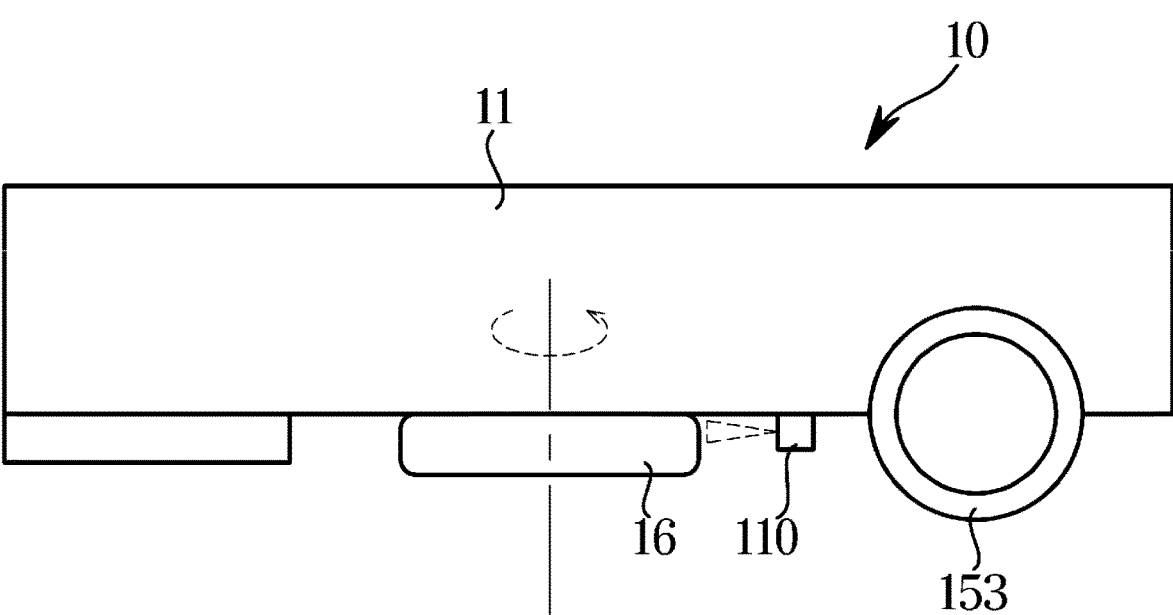
FIG. 3 is a schematic side view of a cleaning robot, according to an embodiment of the disclosure.

FIG. 1 is a top view of a cleaning robot, according to an embodiment, FIG. 2 is a bottom view of a cleaning robot, according to an embodiment, and FIG. 3 is a schematic side view of a cleaning robot, according to an embodiment.

Referring to FIGS. 1 to 3, a cleaning robot 10 according to an embodiment includes a main body 11 defining an exterior, driving wheels 153 (153a and 153b) for moving the main body 11, and a detection sensor module 12 for detecting surrounding objects. For example, the detection sensor module 12 may include a lidar sensor, without being limited thereto, and there are no limitations to the sensor type as long as the sensor is able to detect surrounding objects.

The cleaning robot 10 may detect surrounding objects through the detection sensor module 12, and moving around in an area to be cleaned and performing cleaning by controlling the driving wheels 153 for autonomous driving based on information about the detected surrounding objects, Especially, the cleaning robot 10 may include wet cloth pads 16 (16a and 16b) rotationally arranged on the bottom surface of the main body 11, as shown in FIGS. 2 and 3, and may perform wet cleaning on the floor by rotating the wet cloth pads 16 while autonomously moving around in the area to be cleaned. Although there are two wet cloth pads 16 shown in FIG. 2, there are no limitations to the number of wet cloth pads 16 arranged on the bottom surface of the cleaning robot 10.

The wet cloth pads 16 may receive water through a docking station (not shown) or receive water through a water supply device (not shown) arranged in the cleaning robot 10 itself.

In this case, an amount of water content of the wet cloth pads 16 may be reduced while the cleaning robot 10 moves around and performs cleaning, and the reduction range may differ by degrees of contamination of the floor in the area to be cleaned.

In other words, the higher the degree of contamination of the wet cloth pads 16 as the cleaning is continued, the less the amount of water content of the wet cloth pads 16, so the wet cloth pads 16 need to be replaced or cleaned.

As such, the amount of water content of the wet cloth pads 16 may represent a degree of contamination of the wet cloth pads 16, and an amount of changes thereof may represent a degree of contamination of the floor. Based on this, the cleaning robot 10 in the disclosure aims to increase wet cleaning efficiency of the cleaning robot 10 by identifying and using an amount of water content of the wet cloth pads 16 for control.

Specifically, the cleaning robot 10 may include a light sensor module 110 for irradiating light to the wet cloth pads 16 and detecting an amount of light reflected from the wet cloth pads 16, as shown in FIGS. 2 and 3.

The light sensor module 110 may be arranged on a side to the wet cloth pad 16 to irradiate light and measure an amount of light reflected from the wet cloth pad 16. For this, the light sensor module 110 may include a light source for irradiating light and a light sensor for receiving reflected light.

An exterior of the cleaning robot 10 and components exposed on the exterior have thus far been described. How the cleaning robot 10 controls cleaning intensity of the cleaning robot 10 or determines the cleaning robot 10 to return to the docking station based on an amount of reflection of light from the water cloth pad 16 will now be described in detail.

Figure 4:
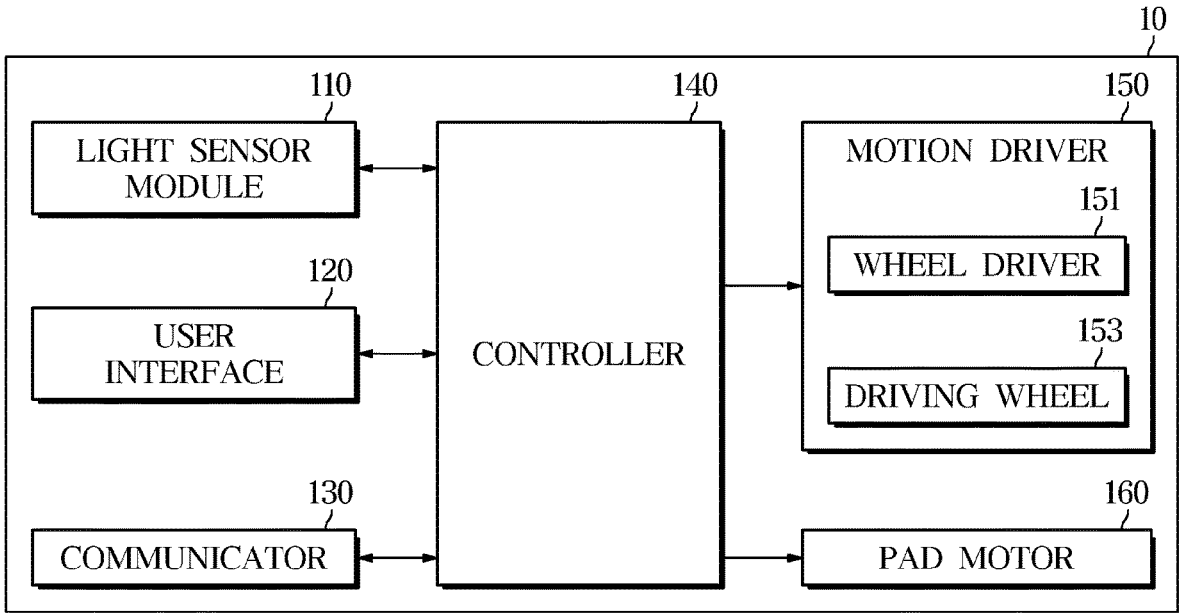
FIG. 4 is a control block diagram of a cleaning robot, according to an embodiment of the disclosure.
Figure 5:
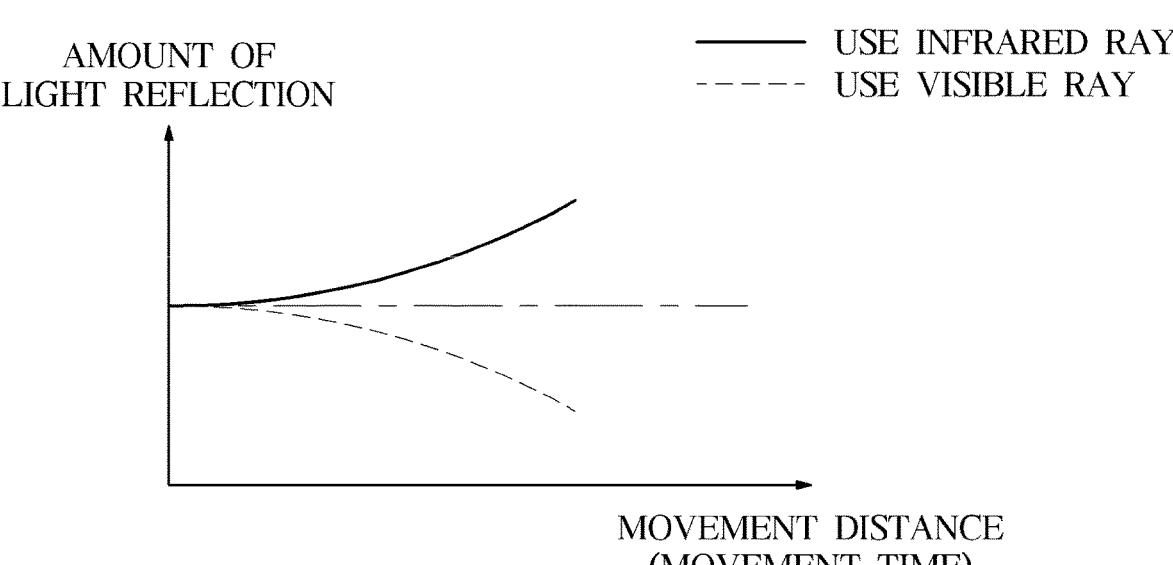
FIG. 5 is a diagram for describing changes in output depending on light sensor module types according to an embodiment of the disclosure.

FIG. 4 is a control block diagram of the cleaning robot 10, according to an embodiment, and FIG. 5 is a diagram for describing changes in output depending on types of the light sensor module 110.

Referring to FIG. 4, the cleaning robot 10 according to an embodiment includes the light sensor module 110 for irradiating light to the wet cloth pad 16 and detecting reflected light, a user interface 120 for receiving an input from the user or displaying information, a communicator 130 for communicating with a user terminal, a controller 140 for controlling cleaning intensity or determining return to the docking station based on an amount of reflection of light reflected from the wet cloth pad 16, a motion driver 150 for moving the main body 11, and a pad motor 160 for rotating the wet cloth pad 16.

The components of the cleaning robot 10 as shown in FIG. 4 are merely an example, and in some embodiments, some of the components shown in FIG. 4 may be omitted or additional components not shown may be added thereto.

In an embodiment, the light sensor module 110 may include a light source arranged on a side to the wet cloth pad 16 for irradiating light to the wet cloth pad 16, and a light sensor for receiving light reflected from the wet cloth pad 16.

Furthermore, the light sensor module 110 may include a signal processing circuit for converting an amount of the received light to an electric signal, an analog to digital (A/D) converter for digitizing the electric signal, a memory for storing the digitized electric signal, and a digital signal processor for interpreting, analyzing and processing the stored signal.

With this, the light sensor module 110 may determine an amount of reflection of light from the wet cloth pad 16 and send the determined amount of reflection of light to the controller 140.

In this case, the light sensor module 110 may use an infrared light source or a visible light source depending on the embodiment.

Infrared rays (e.g., having wavelengths of 900 nm) are absorbed by a liquid, so the more the amount of water content in the wet cloth pad 16, the smaller the amount of infrared light reflected after the infrared light is irradiated to the wet cloth pad 16.

Hence, as shown in FIG. 5, when the light sensor module 110 uses infrared rays, the longer the movement distance or the longer the movement time, the smaller the amount of water content in the wet cloth pad 16, so the amount of reflection of light from the wet cloth pad 16 increases.

On the other hand, visible rays are reflected by a liquid, so the more the amount of water content in the wet cloth pad 16, the more the amount of visible light reflected after the visible light is irradiated to the wet cloth pad 16.

Hence, as shown in FIG. 5, when the light sensor module 110 uses visible rays, the longer the movement distance or the longer the movement time, the smaller the amount of water content in the wet cloth pad 16, and thus the amount of reflection of light from the wet cloth pad 16 decreases.

In an embodiment, the user interface 120 may be arranged on a side of the main body 11 for receiving a user input or displaying information. For this, the user interface 120 may be provided as a known-type of input device or a known-type of display panel, or may have a structure in which a touch panel and a display panel are integrally formed.

For example, the user interface 120 may receive a user input to adjust control intensity when there is a sudden change in amount of reflection of light from the wet cloth pad 16, and receive a user input to adjust a radius of a restricted cleaning area.

Furthermore, the user interface 120 may display a cleaning map corresponding to a cleaning area, and may display a current location as an event occurrence region on the cleaning map when the amount of reflection of light from the wet cloth pad 16 is suddenly changed.

In an embodiment, the communicator 130 may perform wireless communication with a terminal device of the user of the cleaning robot 10. For this, the communicator 130 may be provided as a known-type of radio communication module.

For example, the communicator 130 may receive a user input from the user terminal to adjust control intensity when there is a sudden change in amount of reflection of light from the wet cloth pad 16, and receive a user input from the user terminal to adjust a radius of a restricted cleaning area.

Furthermore, the communicator 130 may transmit, to the user terminal, a control command to display a cleaning map corresponding to the cleaning area, or a current location as an event occurrence region on the cleaning map when the amount of reflection of light from the wet cloth pad 16 is suddenly changed.

In an embodiment, the controller 140 may control rotation speed of the pad motor 160 or control the motion driver 150 to return to the docking station based on the amount of reflection of light from the wet cloth pad 16.

In an embodiment, the controller 140 may control the pad motor 160 to increase rotation speed of the wet cloth pad 16 in proportion to a change rate of the amount of reflection of light from the wet cloth pad 16 during motion.

In this case, in an embodiment, the controller 140 may control the pad motor 160 to increase rotation speed of the wet cloth pad 16 in proportion to an accumulated integral value of amounts of changes in the amount of reflection of light from the wet cloth pad 16 during motion. In other words, the controller 140 may use the accumulated integral value of changes in amount of reflection of light as a control factor in consideration of a measurement error in the amount of reflection of light from the wet cloth pad 16.

In an embodiment, the controller 140 may determine whether to return to the docking station by comparing the amount of reflection of light from the wet cloth pad 16 with a reference amount of reflection of light corresponding to a threshold of degradation of cleaning power.

For example, when the light sensor module 110 transmits or receives infrared light, the controller 140 may control the motion driver 150 to return to the docking station when the amount of reflection of light from the wet cloth pad 16 is equal to or greater than a first reference amount of reflection of light corresponding to the threshold of degradation of cleaning power.

Furthermore, when the light sensor module 110 transmits or receives visible light, the controller 140 may control the motion driver 150 to return to the docking station when the amount of reflection of light from the wet cloth pad 16 is equal to or smaller than a second reference amount of reflection of light corresponding to the threshold of degradation of cleaning power.

In this case, in an embodiment, the controller 140 may determine whether to return to the docking station by comparing an accumulated integral value of amounts of changes in amount of reflection of light from the wet cloth pad 16 with a reference accumulated integral value corresponding to a threshold of degradation of cleaning power. In other words, the controller 140 may use the accumulated integral value of changes in amount of reflection of light as a control factor in consideration of a measurement error in the amount of reflection of light from the wet cloth pad 16.

In an embodiment, the controller 140 may control cleaning or replacement of the wet cloth pad 16 to be guided for the user when controlling the motion driver 150 to return to the docking station. For example, the controller 140 may control the user interface 120 to guide the user to clean or replace the wet cloth pad 16 or control the communicator 130 to transmit a guidance message to the user terminal.

In an embodiment, the controller 140 may control the pad motor 160 not to rotate the wet cloth pad 16 when controlling the motion driver 150 to return to the docking station, thereby preventing the contaminated wet cloth pad 16 having degraded cleaning power from rotating and cleaning the floor thus to contaminate the floor.

In an embodiment, the controller 140 may control the wet cloth pad 16 to be separated from the floor when controlling the motion driver 150 to return to the docking station. For example, the controller 140 may control an actuator (not shown) mechanically connected to the wet cloth pad 16 to move the wet cloth pad 16 in a opposite direction from gravity, or control the actuator (not shown) connected to the driving wheels 153 to move the main body 11 in the opposite direction from gravity.

In an embodiment, the controller 140 may control the motion driver 150 to return to the docking station as soon as the amount of reflection of light from the wet cloth pad 16 changes at a preset change rate or higher.

Furthermore, in an embodiment, the controller 140 may adjust the reference amount of reflection of light corresponding to a threshold of degradation of cleaning power to return to the docking station sooner when the amount of reflection of light from the wet cloth pad 16 changes at the preset change rate or higher.

For example, the controller 140 may adjust the first reference amount of reflection of light, which is a criterion for comparison when infrared rays are used, to decrease, and adjust the second reference amount of reflection of light, which is a criterion for comparison when visible rays are used, to increase.

In this case, the controller 140 may change a degree of adjusting the reference amount of reflection of light based on user settings. In other words, the user may control sensitivity of the control through the user interface 120 or the user terminal when the amount of reflection of light from the wet cloth pad 16 changes abruptly.

Furthermore, in an embodiment, the controller 140 may adjust the reference amount of reflection of light corresponding to the threshold of degradation of cleaning power to return to the docking station sooner when the amount of reflection of light from the wet cloth pad 16 is kept at the preset change rate or higher for a preset period of time.

In an embodiment, the controller 140 may control a current location to be displayed as an event occurrence region on the cleaning map when the amount of reflection of light from the wet cloth pad 16 changes at the preset change rate or higher. For example, the controller 140 may control the user interface 120 to display the current location on the cleaning map as an event occurrence region. Furthermore, the controller 140 may control the communicator 130 to transmit, to the user terminal, a control command to display the current location on the cleaning map as an event occurrence region.

In an embodiment, the controller 140 may set the current location to a restricted cleaning area when the amount of reflection of light from the wet cloth pad 16 changes at the preset change rate or higher. In this case, the controller 140 may adjust the radius of the restricted cleaning area based on user settings in an embodiment. For example, the controller 140 may adjust the radius of the restricted cleaning area based on a user input received from the user interface 120 or entered by the user terminal and received through the communicator 130.

The controller 140 may include at least one memory for storing a program for carrying out the aforementioned and following operations, and at least one processor for executing the program. In a case that the memory and the processor are each provided in the plural, they may be integrated in a single chip or physically distributed.

In an embodiment, the motion driver 150 may include the driving wheels 153 arranged on the left and right of the main body 11 and a wheel driver 151 for providing power to the driving wheels 153, and the wheel driver 151 may include a wheel motor and a driving circuit.

In an embodiment, the pad motor 160 may rotate the wet cloth pad 16, and change the rotation speed under the control of the controller 140 to change the rotation speed of the wet cloth pad 16.

The control block diagram of the cleaning robot 10 has thus far been described. How the cleaning robot 10 performs control based on the amount of reflection of light from the wet cloth pad 16 will now be described based on the control block diagram.

Figure 6:
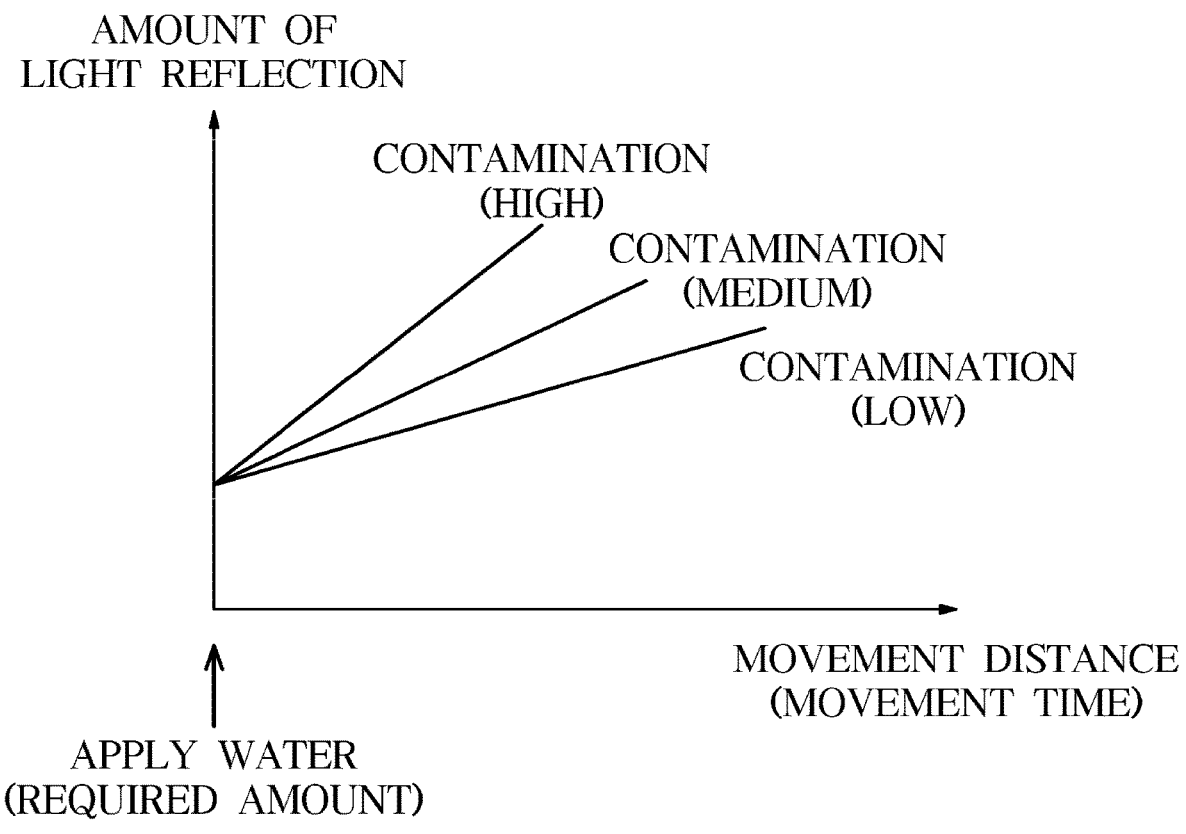
FIG. 6 is a diagram for describing an occasion when a cleaning robot controls cleaning intensity based on an amount of reflection of light, according to an embodiment of the disclosure.
Figure 7:
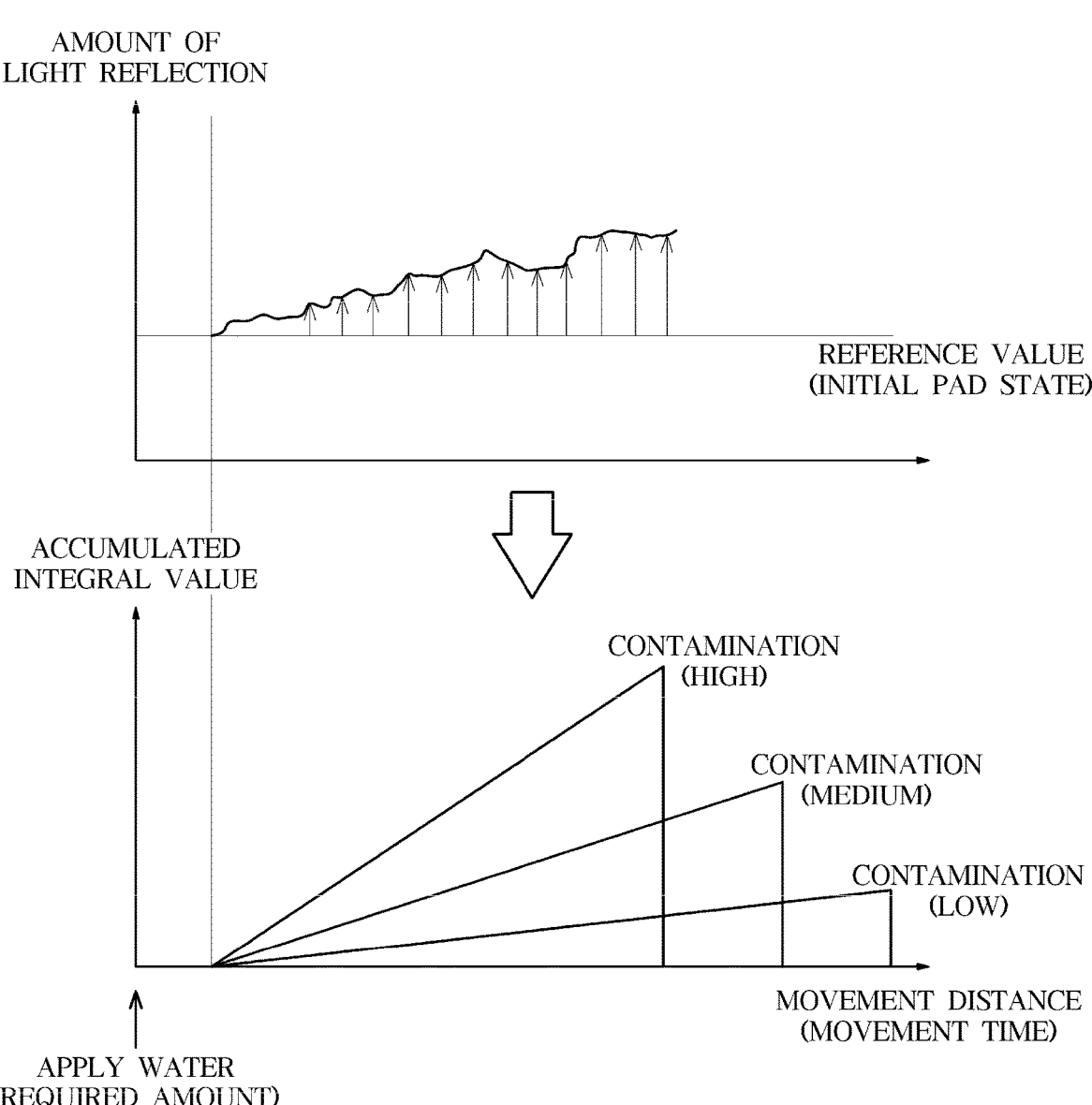
FIG. 7 is a diagram for describing an occasion when a cleaning robot controls cleaning intensity based on an accumulated integral value of amounts of changes in amount of reflection of light, according to an embodiment of the disclosure.

FIG. 6 is a diagram for describing an occasion when the cleaning robot 10 controls cleaning intensity based on an amount of reflection of light, according to an embodiment, and FIG. 7 is a diagram for describing an occasion when the cleaning robot 10 controls cleaning intensity based on an accumulated integral value of amounts of changes in amount of reflection of light, according to an embodiment.

Referring to FIG. 6, in an embodiment, the cleaning robot 10 may control the pad motor 160 to increase rotation speed of the wet cloth pad 16 in proportion to a change rate of the amount of reflection of light from the wet cloth pad 16 during motion.

For example, when the cleaning robot 10 performs cleaning while moving around, the contamination degree of the wet cloth pad 16 may increase and the amount of water content of the wet cloth pad 16 may decrease, and when the light sensor module 110 uses infrared rays, the amount of reflection of light from the wet cloth pad 16 may increase.

In this case, as shown in FIG. 6, the higher the contamination degree of the floor, the larger the amount of changes in amount of water content of the wet cloth pad 16, so the change rate (a change slope) of the amount of reflection of light from the wet cloth pad 16 may increase.

The cleaning robot 10 adaptively controls cleaning intensity depending on the contamination degree of the floor by increasing cleaning intensity on the floor as the rotation speed of the wet cloth pad 16 increases the higher the change rate of the amount of reflection of light from the wet cloth pad 16.

For example, the cleaning robot 10 may divide the cleaning intensity into three levels (e.g., strong, normal, speedy) to adaptively change the cleaning intensity depending on the change rate (change slope) of the amount of reflection of light from the wet cloth pad 16.

Furthermore, in an embodiment, the cleaning robot 10 may control the pad motor 160 to increase rotation speed of the wet cloth pad 16 in proportion to an accumulated integral value of amounts of changes in the amount of reflection of light from the wet cloth pad 16 during motion, as shown in FIG. 7. In other words, the controller 140 may use the accumulated integral value of changes in amount of reflection of light as a control factor in consideration of a measurement error in the amount of reflection of light from the wet cloth pad 16.

Although FIGS. 6 and 7 illustrate a case that the light sensor module 110 uses infrared rays, embodiments of the disclosure are not limited thereto, but descriptions of FIGS. 6 and 7 may also be applied to a case that the light sensor module 110 uses visible rays with the exception of the direction of a change in amount of reflection of light during motion.

Figure 8:
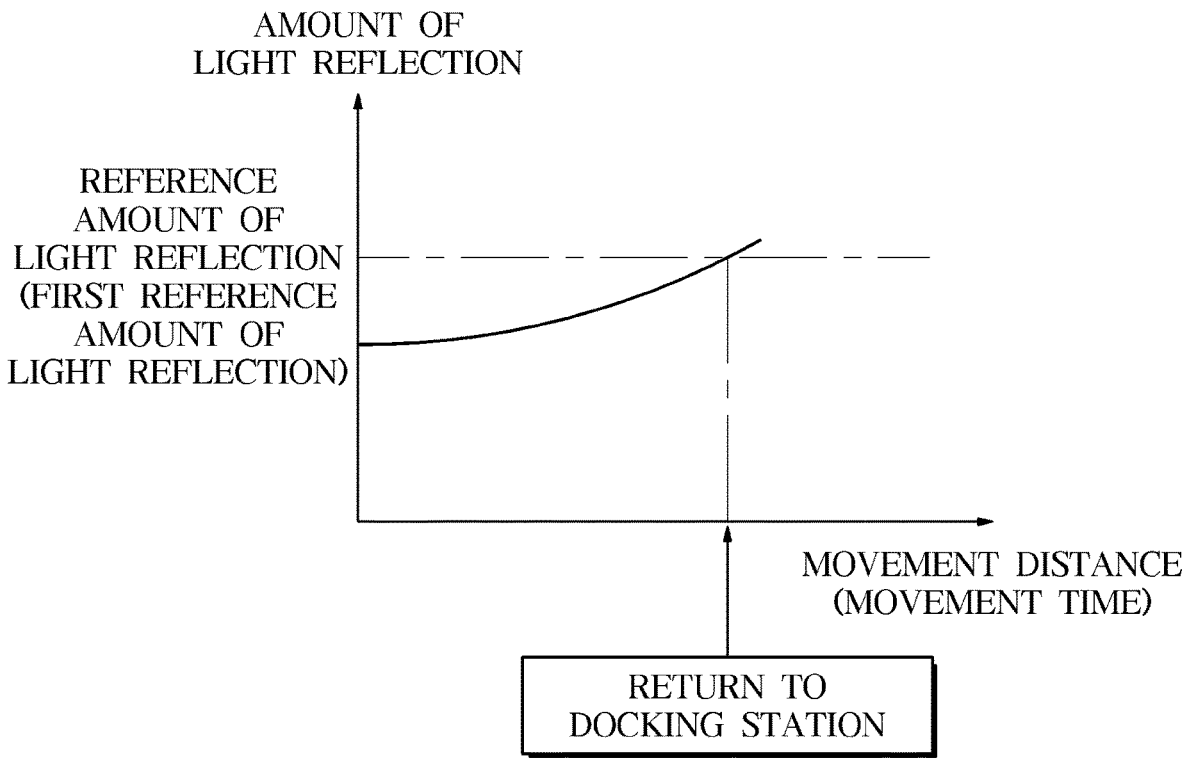
FIG. 8 is a diagram for describing an occasion when a cleaning robot uses a light sensor module that uses infrared rays to determine return to a docking station, according to an embodiment of the disclosure.
Figure 9:
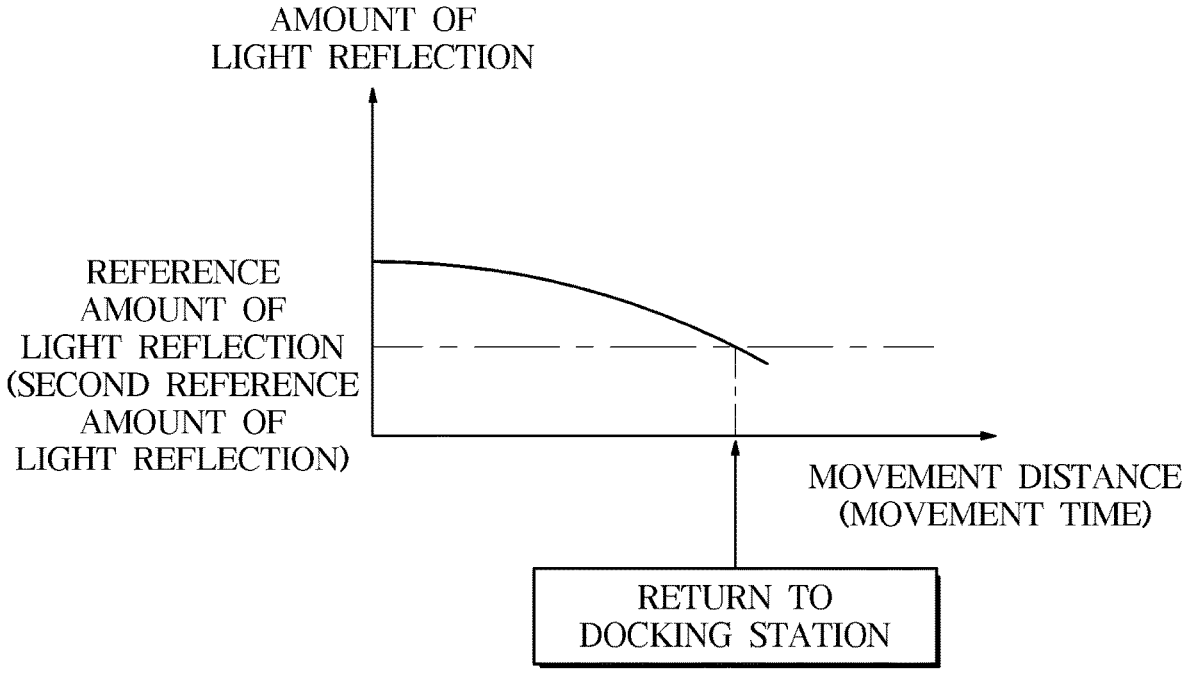
FIG. 9 is a diagram for describing an occasion when a cleaning robot uses a light sensor module that uses visible rays to determine return to a docking station, according to an embodiment of the disclosure.
Figure 10:
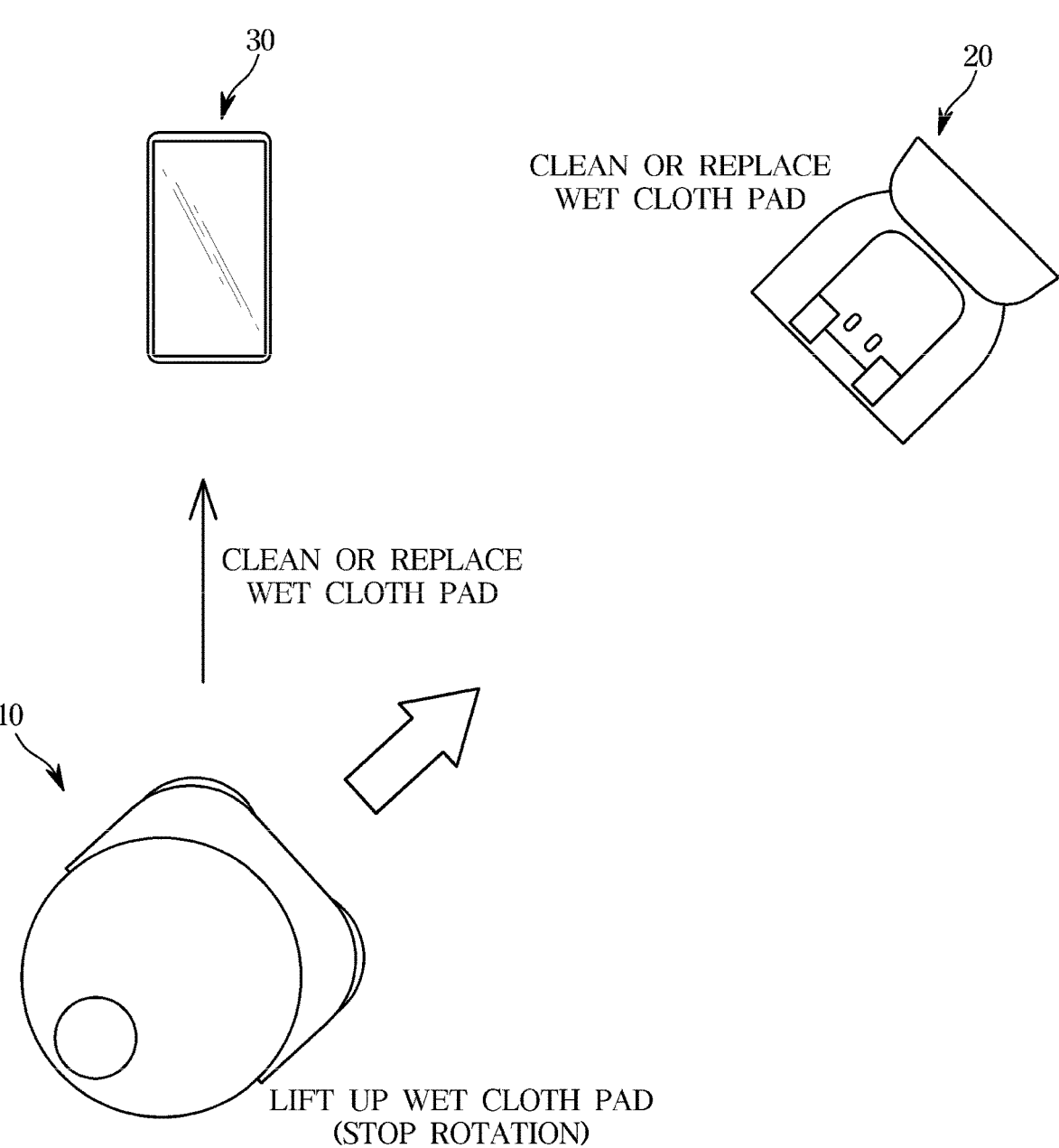
FIG. 10 is a diagram for describing an occasion when a cleaning robot returns to a docking station, according to an embodiment of the disclosure.

FIG. 8 is a diagram for describing an occasion when the cleaning robot 10 uses the light sensor module 110 that uses infrared rays to determine return to a docking station, according to an embodiment, FIG. 9 is a diagram for describing an occasion when the cleaning robot 10 uses the light sensor module 110 that uses visible rays to determine return to a docking station, according to an embodiment, and FIG. 10 is a diagram for describing an occasion when the cleaning robot 10 returns to a docking station, according to an embodiment.

Referring to FIGS. 8 and 9, the cleaning robot 10 according to an embodiment may determine whether to return to the docking station by comparing the amount of reflection of light from the wet cloth pad 16 with a reference amount of reflection of light corresponding to a threshold of degradation of cleaning power.

Specifically, the cleaning robot 10 may determine whether to return to the docking station by comparing the amount of reflection of light from the wet cloth pad 16 with the reference amount of reflection of light corresponding to a threshold of degradation of cleaning power, thereby preventing an occasion when the wet cloth pad 16 performs cleaning and contaminates the floor, and guiding the user to replace or clean the wet cloth pad 16 or automatically replacing or cleaning the wet cloth pad 16 at the docking station.

For example, as shown in FIG. 8, when the light sensor module 110 transmits or receives infrared light, the cleaning robot 10 may control the motion driver 150 to return to the docking station when the amount of reflection of light from the wet cloth pad 16 is equal to or greater than a first reference amount of reflection of light corresponding to the threshold of degradation of cleaning power.

Furthermore, as shown in FIG. 9, when the light sensor module 110 transmits or receives visible light, the cleaning robot 10 may control the motion driver 150 to return to the docking station when the amount of reflection of light from the wet cloth pad 16 is equal to or smaller than a second reference amount of reflection of light corresponding to the threshold of degradation of cleaning power.

In this case, in an embodiment, the cleaning robot 10 may determine whether to return to the docking station by comparing an accumulated integral value of amounts of changes in amount of reflection of light from the wet cloth pad 16 with a reference accumulated integral value corresponding to a threshold of degradation of cleaning power. In other words, the controller 140 may use the accumulated integral value of changes in amount of reflection of light as a control factor in consideration of a measurement error in the amount of reflection of light from the wet cloth pad 16.

In an embodiment, as shown in FIG. 10, the cleaning robot 10 may control cleaning or replacement of the wet cloth pad 16 to be guided for the user when controlling the motion driver 150 to return to a docking station 20. For example, the controller 140 may control the user interface 120 to guide the user to clean or replace the wet cloth pad 16 or control the communicator 130 to transmit a guidance message to a user terminal 30.

In an embodiment, as shown in FIG. 10, the cleaning robot 10 may control the pad motor 160 not to rotate the wet cloth pad 16 when controlling the motion driver 150 to return to the docking station 20, thereby preventing the contaminated wet cloth pad 16 having degraded cleaning power from rotating and cleaning the floor thus to contaminate the floor.

In an embodiment, as shown in FIG. 10, the cleaning robot 10 may control the wet cloth pad 16 to be separated from the floor when controlling the motion driver 150 to return to the docking station 20. For example, the controller 140 may control an actuator (not shown) mechanically connected to the wet cloth pad 16 to move the wet cloth pad 16 in a opposite direction from gravity, or control the actuator (not shown) connected to the driving wheels 153 to move the main body 11 in the opposite direction from gravity.

Furthermore, when docked with the cleaning robot 10, the docking station 20 may automatically replace or clean the wet cloth pad 16 of the cleaning robot 10 as well as charge the battery of the cleaning robot 10.

Figure 11:
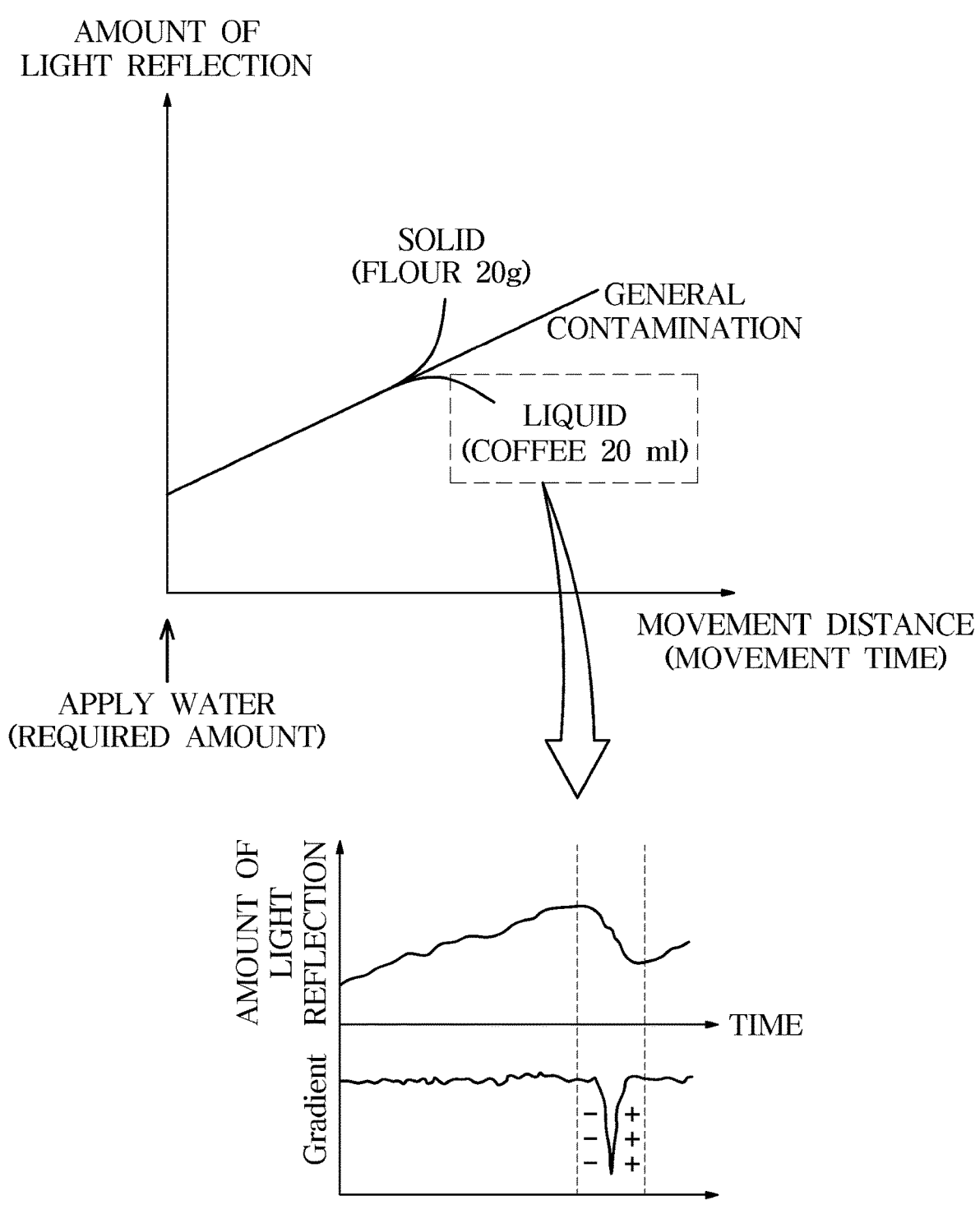
FIG. 11 is a diagram for illustrating an occasion when a cleaning robot identifies contamination patterns based on an amount of reflection of light, according to an embodiment of the disclosure.
Figure 12:
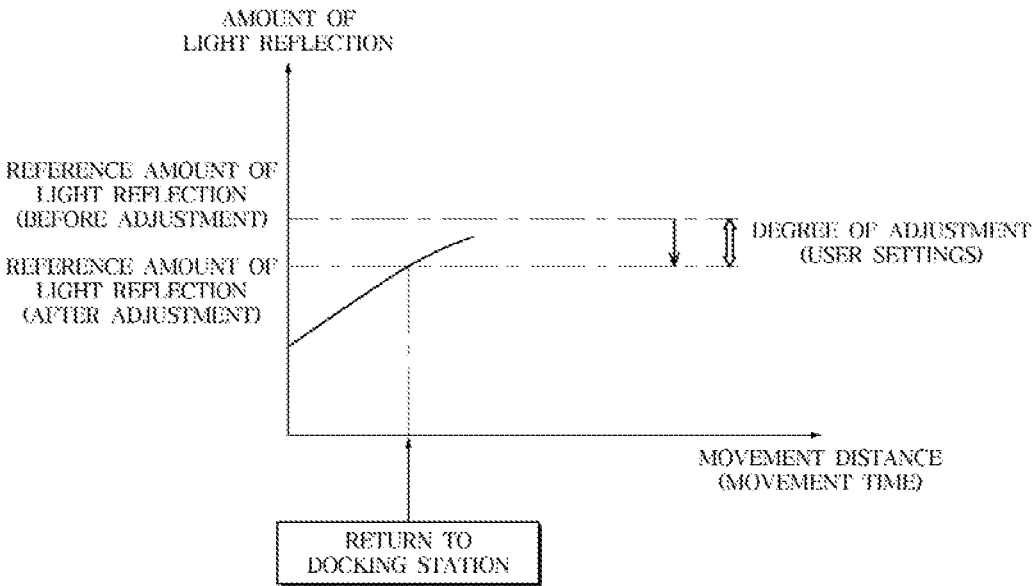
FIG. 12 is a diagram for describing an occasion of adjusting a reference amount of reflection of light when a cleaning robot identifies contamination patterns, according to an embodiment of the disclosure.
Figure 13:
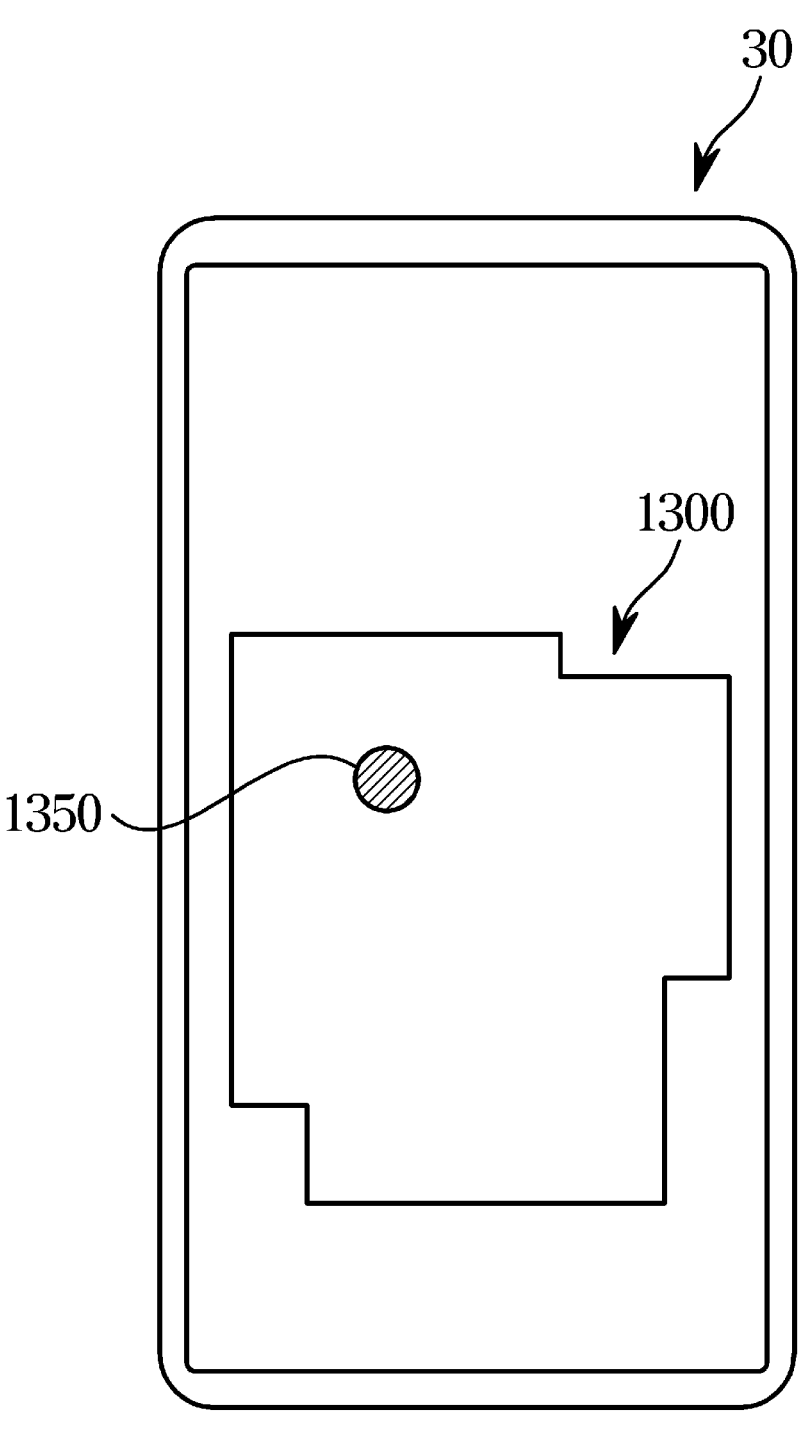
FIG. 13 illustrates an occasion of displaying an event occurrence region on a cleaning map when a cleaning robot identifies contamination patterns, according to an embodiment of the disclosure.

FIG. 11 is a diagram for illustrating an occasion when the cleaning robot 10 identifies contamination patterns based on an amount of reflection of light, according to an embodiment, FIG. 12 is a diagram for describing an occasion of adjusting a reference amount of reflection of light when the cleaning robot 10 identifies contamination patterns, according to an embodiment, and FIG. 13 illustrates an occasion of displaying an event occurrence region on a cleaning map when the cleaning robot 10 identifies contamination patterns, according to an embodiment.

Referring to FIG. 11, the cleaning robot 10 in an embodiment may determine whether the amount of reflection of light from the wet cloth pad 16 changes at a preset change rate or higher based on the amount of reflection of light reflecting from the wet cloth pad 16.

When the cleaning robot 10 absorbs a lot of liquid contaminants (e.g., absorbs 20 ml of coffee) while moving around to perform cleaning, the amount of reflection of light from the wet cloth pad 16 may decrease dramatically (in a case that the light sensor module 110 uses infrared rays).

Furthermore, when the cleaning robot 10 absorbs a lot of solid contaminants (e.g., absorbs 20 g of flour) while moving around to perform cleaning, the amount of reflection of light from the wet cloth pad 16 may increase dramatically (in a case that the light sensor module 110 uses infrared rays).

As such, when a lot of liquid contaminants are absorbed or a lot of solid contaminants are absorbed, the contamination degree of the wet cloth pad 16 increases significantly, so the cleaning with the wet cloth pad 16 may be inefficient.

Hence, the cleaning robot 10 in an embodiment may control the motion driver 150 to return to the docking station 20 as soon as the amount of reflection of light from the wet cloth pad 16 changes at a preset change rate or higher.

Furthermore, in an embodiment, the cleaning robot 10 may adjust the reference amount of reflection of light corresponding to a threshold of degradation of cleaning power to return to the docking station 20 sooner when the amount of reflection of light from the wet cloth pad 16 changes at the preset change rate or higher.

For example, the cleaning robot 10 may adjust the first reference amount of reflection of light, which is a criterion for comparison when using infrared rays, to decrease, as shown in FIG. 12. Furthermore, the cleaning robot 10 may adjust the second reference amount of reflection of light, which is a criterion for comparison when using visible rays, to increase.

In this case, the cleaning robot 10 may change a degree of adjusting the reference amount of light reflection based on user settings in an embodiment. In other words, the user may control sensitivity of the control through the user interface 120 or the user terminal when the amount of reflection of light from the wet cloth pad 16 changes abruptly.

Furthermore, in an embodiment, the cleaning robot 10 may adjust the reference amount of reflection of light corresponding to a threshold of degradation of cleaning power to make return to the docking station 20 sooner when the amount of reflection of light from the wet cloth pad 16 is kept at the preset change rate or higher for a preset period of time, as shown in FIG. 11. In other words, the cleaning robot 10 may determine an amount of reflection of light from the wet cloth pad 16 as noise when the amount of reflection of light is not maintained at the preset change rate or higher for the preset period of time, to return to the docking station 20 sooner.

Furthermore, in an embodiment, the cleaning robot 10 may control a current location to be displayed as an event occurrence region on a cleaning map when the amount of reflection of light from the wet cloth pad 16 changes at the preset change rate or higher.

For example, the cleaning robot 10 may control the user interface 120 to display the current location on the cleaning map as an event occurrence region.

Furthermore, the cleaning robot 10 may control the communicator 130 to transmit, to the user terminal 30, a control command to display the current location on the cleaning map as an event occurrence region. In this case, the user terminal 30 may display an event occurrence region 1350 on a cleaning map 1300, as shown in FIG. 13.

In an embodiment, the cleaning robot 10 may set the current location to a restricted cleaning area when the amount of reflection of light from the wet cloth pad 16 changes at the preset change rate or higher. In this case, the cleaning robot 10 may adjust the radius of the restricted cleaning area based on user settings in an embodiment. For example, the cleaning robot 10 may adjust the radius of the restricted cleaning area based on a user input received from the user interface 120 or entered by the user terminal 30 and received through the communicator 130.

An embodiment of a method of controlling the cleaning robot 10 will now be described from a perspective. As for the method of controlling the cleaning robot 10, the cleaning robot 10 in the aforementioned embodiments may be used. Hence, what are described above with reference to FIGS. 1 to 13 may be equally applied in the following method of controlling the cleaning robot 10.

Figure 14:
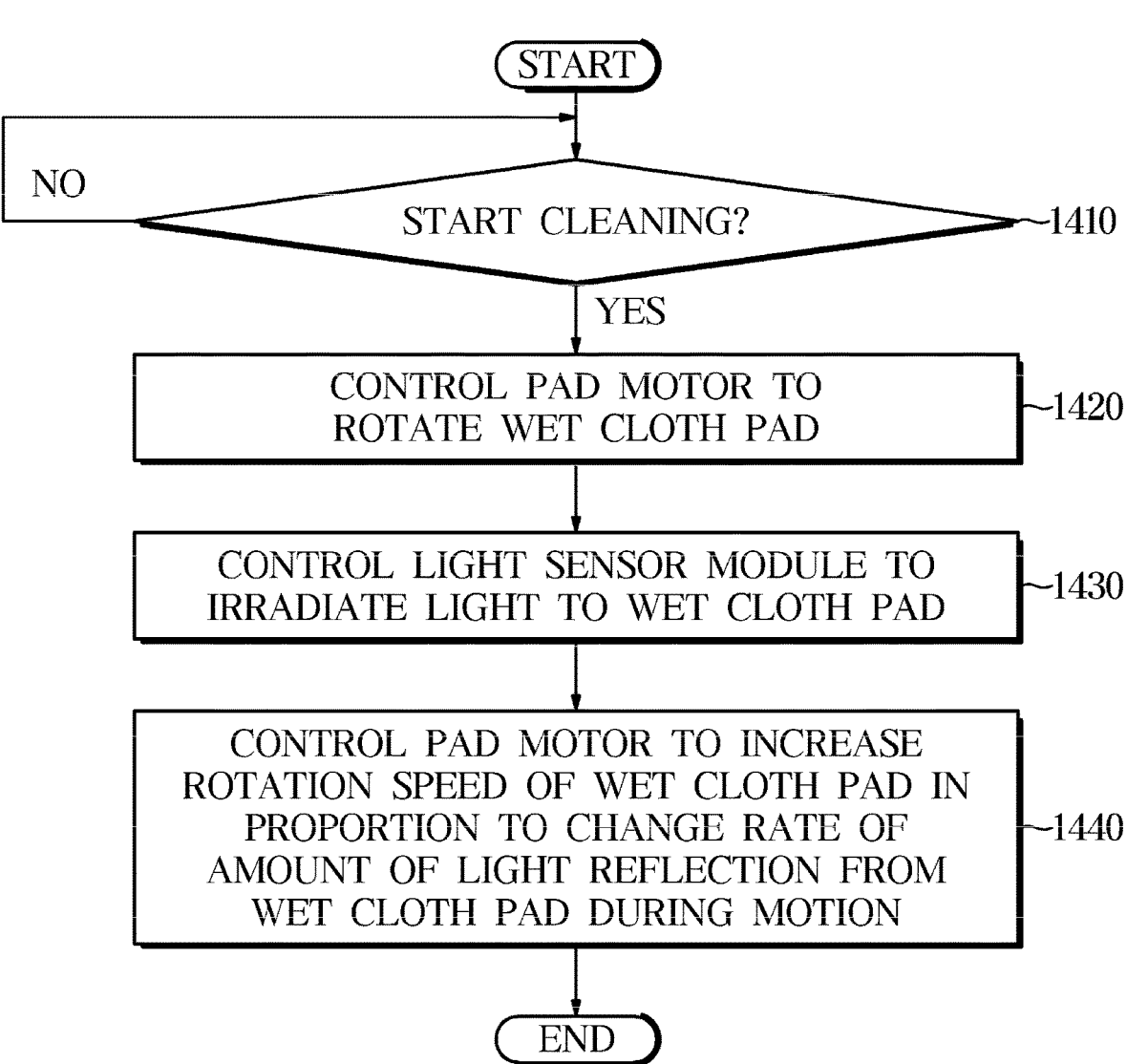
FIG. 14 is a flowchart of controlling rotation speed of a pad motor based on an amount of reflection of light from a wet cloth pad in a method of controlling a cleaning robot, according to an embodiment of the disclosure.

FIG. 14 is a flowchart of controlling rotation speed of the pad motor 160 based on an amount of reflection of light from the wet cloth pad 16 in a method of controlling the cleaning robot 10, according to an embodiment.

Referring to FIG. 14, in an embodiment, when the cleaning robot 10 starts cleaning in 1410, the cleaning robot 10 may control the pad motor 160 to rotate the wet cloth pad 16 in 1420 and control the light sensor module 110 to irradiate light to the wet cloth pad 16 in 1430.

In an embodiment, the cleaning robot 10 may control the pad motor 160 to increase rotation speed of the wet cloth pad 16 in proportion to a change rate of the amount of reflection of light from the wet cloth pad 16 during motion, in 1440.

Specifically, the cleaning robot 10 adaptively controls cleaning intensity depending on the contamination degree of the floor by increasing cleaning intensity on the floor as the rotation speed of the wet cloth pad 16 increases the higher the change rate of the amount of light reflection from the wet cloth pad 16.

For example, the cleaning robot 10 may divide the cleaning intensity into three levels (e.g., strong, normal, speedy) to adaptively change the cleaning intensity depending on the change rate (change slope) of the amount of reflection of light from the wet cloth pad 16.

Figure 15:
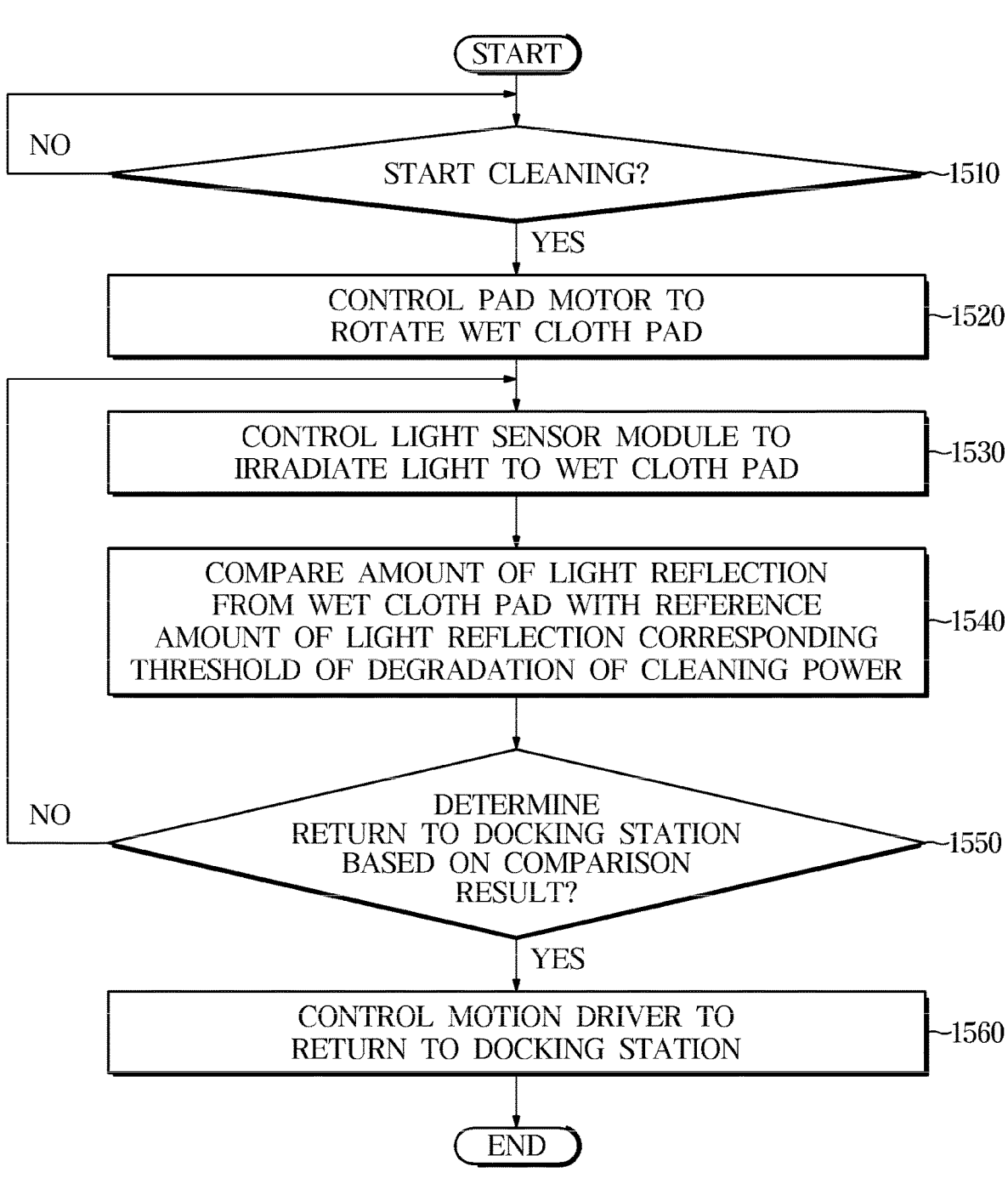
FIG. 15 is a flowchart of controlling return to a docking station based on an amount of reflection of light from a wet cloth pad in a method of controlling a cleaning robot, according to an embodiment of the disclosure.

FIG. 15 is a flowchart of controlling return to the docking station 20 based on an amount of reflection of light from the wet cloth pad 16 in a method of controlling the cleaning robot 10, according to an embodiment.

Referring to FIG. 15, in an embodiment, when the cleaning robot 10 starts cleaning in 1510, the cleaning robot 10 may control the pad motor 160 to rotate the wet cloth pad 16 in 1520 and control the light sensor module 110 to irradiate light to the wet cloth pad 16 in 1530.

In an embodiment, the cleaning robot 10 may compare the amount of reflection of light from the wet cloth pad 16 with a reference amount of reflection of light corresponding to a threshold of degradation of cleaning power in 1540, and when determining to return to the docking station 20 based on the comparison result in 1550, the cleaning robot 10 may control the motion driver 150 to return to the docking station 20 in 1560.

Specifically, the cleaning robot 10 may determine whether to return to the docking station by comparing the amount of reflection of light from the wet cloth pad 16 with the reference amount of reflection of light corresponding to the threshold of degradation of cleaning power, thereby preventing an occasion when the wet cloth pad 16 performs cleaning and contaminates the floor, and guiding the user to replace or clean the wet cloth pad 16 or automatically replacing or cleaning the wet cloth pad 16 at the docking station.

For example, when the light sensor module 110 transmits or receives infrared light, the cleaning robot 10 may control the motion driver 150 to return to the docking station when the amount of reflection of light from the wet cloth pad 16 is equal to or greater than a first reference amount of light reflection corresponding to the threshold of degradation of cleaning power.

Furthermore, when the light sensor module 110 transmits or receives visible light, the cleaning robot 10 may control the motion driver 150 to return to the docking station when the amount of reflection of light from the wet cloth pad 16 is equal to or smaller than a second reference amount of light reflection corresponding to the threshold of degradation of cleaning power.

Figure 16:
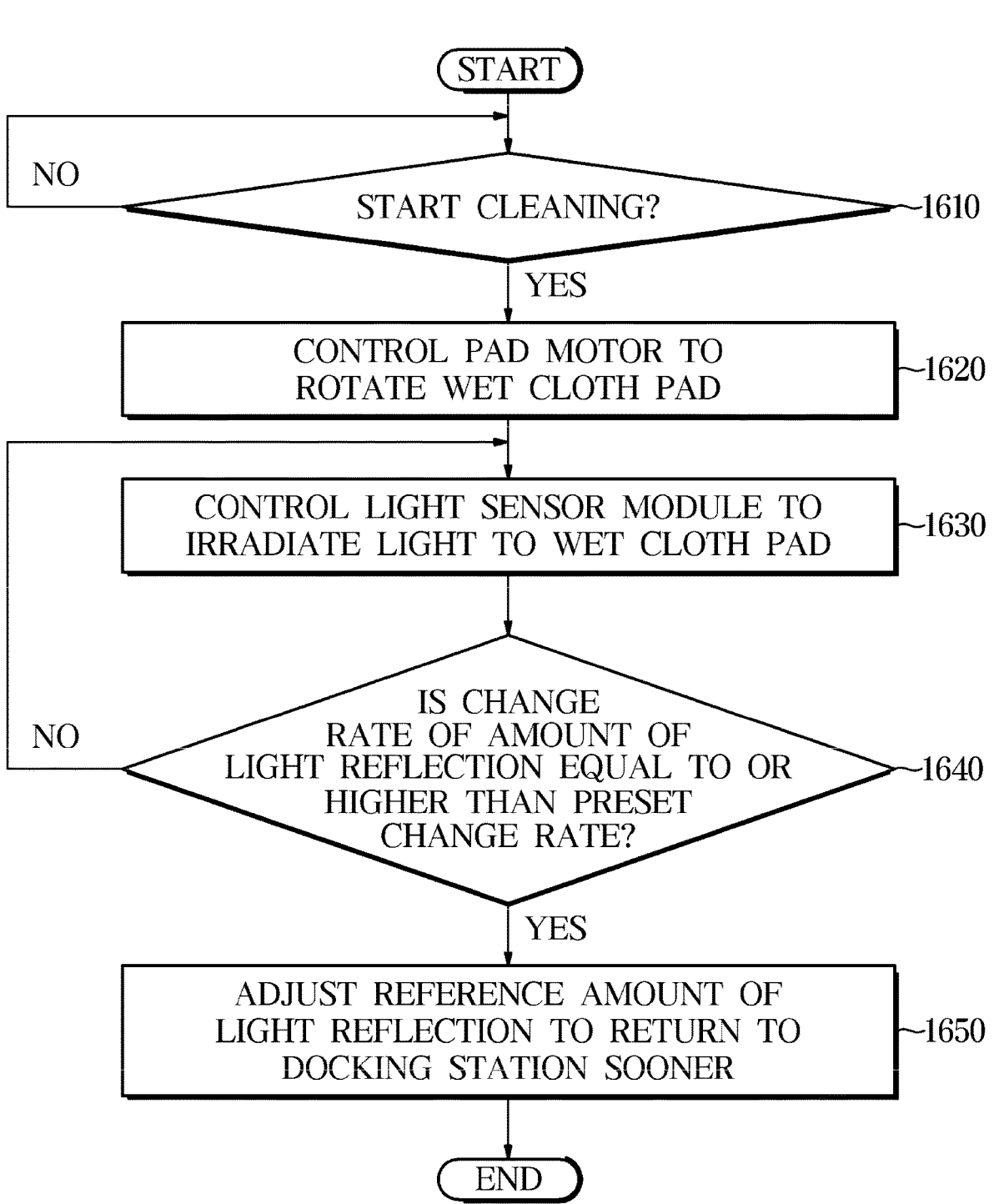
FIG. 16 is a flowchart of adjusting a reference amount of reflection of light to return to a docking station in a method of controlling a cleaning robot, according to an embodiment of the disclosure.

FIG. 16 is a flowchart of adjusting a reference amount of light reflection to return to the docking station 20 in a method of controlling the cleaning robot 10, according to an embodiment.

Referring to FIG. 16, in an embodiment, when the cleaning robot 10 starts cleaning in 1610, the cleaning robot 10 may control the pad motor 160 to rotate the wet cloth pad 16 in 1620 and control the light sensor module 110 to irradiate light to the wet cloth pad 16 in 1630.

In an embodiment, when a change rate of the amount of light reflection is equal to or higher than a preset change rate in 1640, the cleaning robot 10 may adjust the reference amount of light reflection to return to the docking station 20 sooner in 1650.

Furthermore, in an embodiment, the cleaning robot 10 may adjust the reference amount of reflection of light corresponding to a threshold of degradation of cleaning power to return to the docking station 20 sooner when the amount of reflection of light from the wet cloth pad 16 changes at the preset change rate or higher.

For example, the cleaning robot 10 may adjust the first reference amount of reflection of light, which is a criterion for comparison when using infrared rays, to decrease. Furthermore, the cleaning robot 10 may adjust the second reference amount of reflection of light, which is a criterion for comparison when using visible rays, to increase.

Meanwhile, the embodiments of the disclosure may be implemented in the form of a recording medium for storing instructions to be carried out by a computer. The instructions may be stored in the form of program codes, and when executed by a processor, may generate program modules to perform operation in the embodiments of the disclosure. The recording media may correspond to computer-readable recording media.

The computer-readable recording medium includes any type of recording medium having data stored thereon that may be thereafter read by a computer. For example, it may be a read only memory (ROM), a random access memory (RAM), a magnetic tape, a magnetic disk, a flash memory, an optical data storage device, etc.

The embodiments of the disclosure have thus far been described with reference to accompanying drawings. It will be obvious to those of ordinary skill in the art that the disclosure may be practiced in other forms than the embodiments of the disclosure as described above without changing the technical idea or essential features of the disclosure. The above embodiments of the disclosure are only by way of example, and should not be construed in a limited sense.

What is claimed is:

1. A cleaning robot comprising:
a main body;
a motion driver configured to move the main body;
a pad motor configured to rotate a pad below a bottom surface of the main body;
a light source configured to irradiate light to the pad; and
at least one processor configured to, based on an amount of reflection of the light from the pad, perform control of the pad motor and the motion driver,
wherein the control of pad motor comprises controlling rotation speed of the pad motor and control of the motion driver comprises controlling the motion driver to return the cleaning robot to a docking station.

2. The cleaning robot of claim 1, wherein
the at least one processor is configured to control the pad motor to increase the rotation speed of the pad in proportion to a change rate of the amount of reflection of the light from the pad during motion.

3. The cleaning robot of claim 1, wherein
the at least one processor is configured to control the pad motor to increase the rotation speed of the pad in proportion to an accumulated integral value of amounts of changes in the amount of reflection of the light from the pad during motion.

4. The cleaning robot of claim 1, wherein the at least one processor is configured to determine whether to control the motion driver to return the cleaning robot to the docking station by comparing the amount of reflection of the light from the pad with a reference amount of light reflection corresponding to a threshold of degradation of cleaning power.

5. The cleaning robot of claim 4, wherein the light is infrared light, and the at least one processor is configured to control the motion driver to return the cleaning robot to the docking station based on the amount of reflection of the light from the pad being equal to or greater than the reference amount of light reflection corresponding to the threshold of degradation of cleaning power.

6. The cleaning robot of claim 4, wherein the light is visible light, and the at least one processor is configured to control the motion driver to return the cleaning robot to the docking station based on the amount of reflection of the light from the pad being equal to or smaller than the reference amount of light reflection corresponding to the threshold of degradation of cleaning power.

7. The cleaning robot of claim 4, wherein the at least one processor is configured to control a user interface to guide at least one of a cleaning of the pad and a replacement of the pad based on controlling the motion driver to return the cleaning robot to the docking station.

8. The cleaning robot of claim 4, wherein the at least one processor is configured to control the pad motor not to rotate the pad based on controlling the motion driver to return the cleaning robot to the docking station.

9. The cleaning robot of claim 4, wherein the at least one processor is configured to control the pad to be separated from a floor based on controlling the motion driver to return the cleaning robot to the docking station.

10. The cleaning robot of claim 4, wherein the at least one processor is configured to determine whether to control the motion driver to return the cleaning robot to the docking station by comparing an accumulated integral value of amounts of changes in the amount of reflection of the light from the pad with a reference accumulated integral value corresponding to a threshold of degradation of cleaning power.

11. The cleaning robot of claim 4, wherein the at least one processor is configured to adjust the reference amount of light reflection corresponding to the threshold of degradation of cleaning power to control the motion driver to return the cleaning robot to the docking station sooner based on the amount of reflection of the light from the pad changing at a preset change rate or higher.

12. The cleaning robot of claim 11, wherein the at least one processor is configured to change an amount of adjusting the reference amount of light reflection according to user settings.

13. The cleaning robot of claim 11, wherein the at least one processor is configured to adjust the reference amount of light reflection corresponding to the threshold of degradation of cleaning power to control the motion driver to return the cleaning robot to the docking station sooner based on the amount of reflection of the light from the pad remaining at the preset change rate or higher for a preset period of time.

14. The cleaning robot of claim 11, wherein the at least one processor is configured to control a current location of the cleaning robot to be displayed as an event occurrence region on a cleaning map based on the amount of reflection of the light from the pad changing at the preset change rate or higher.

15. The cleaning robot of claim 11, wherein the at least one processor is configured to set a current location of the cleaning robot to a restricted cleaning area based on the amount of reflection of the light from the pad changing at the preset change rate or higher.

* * * * *